Patented Aug. 18, 1925.

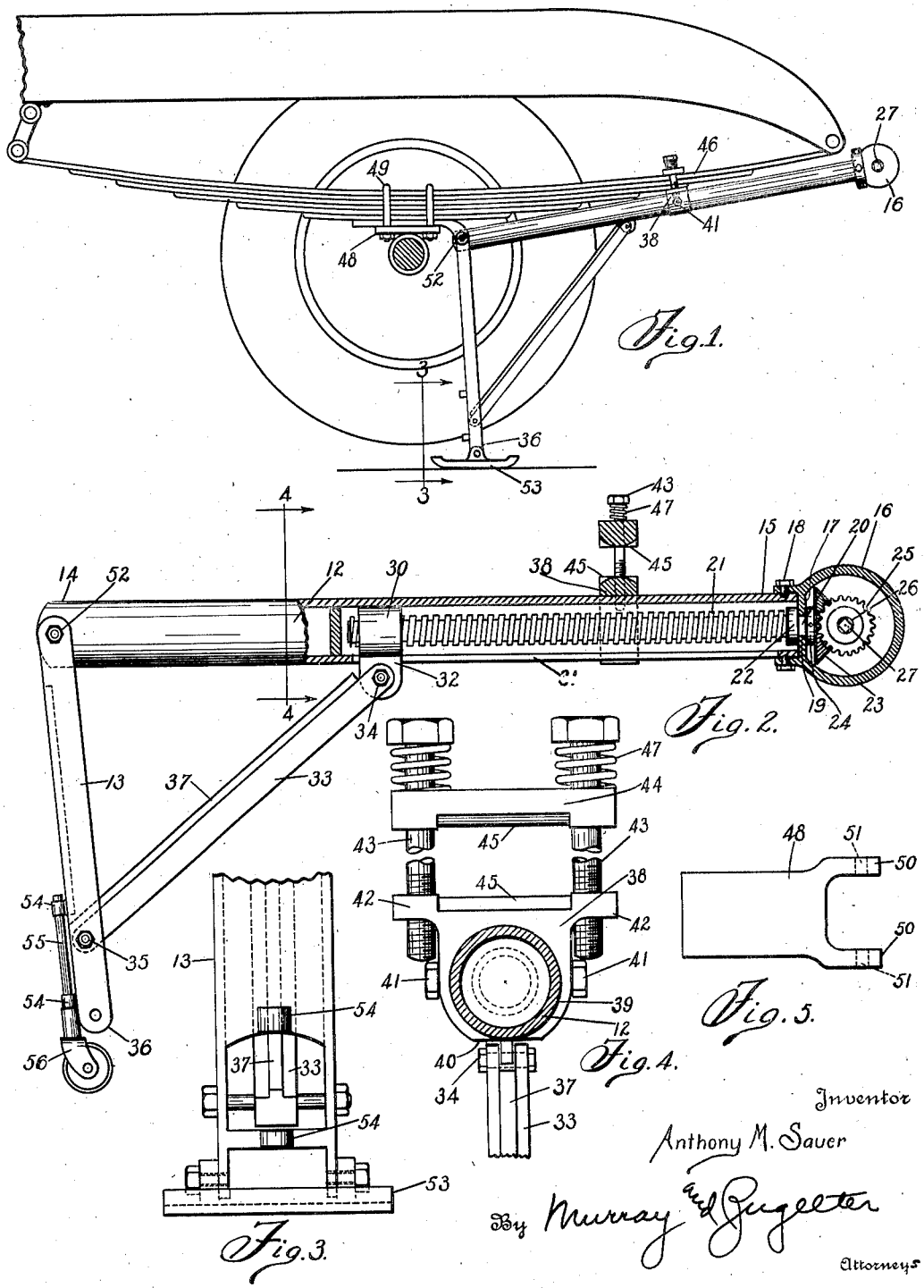

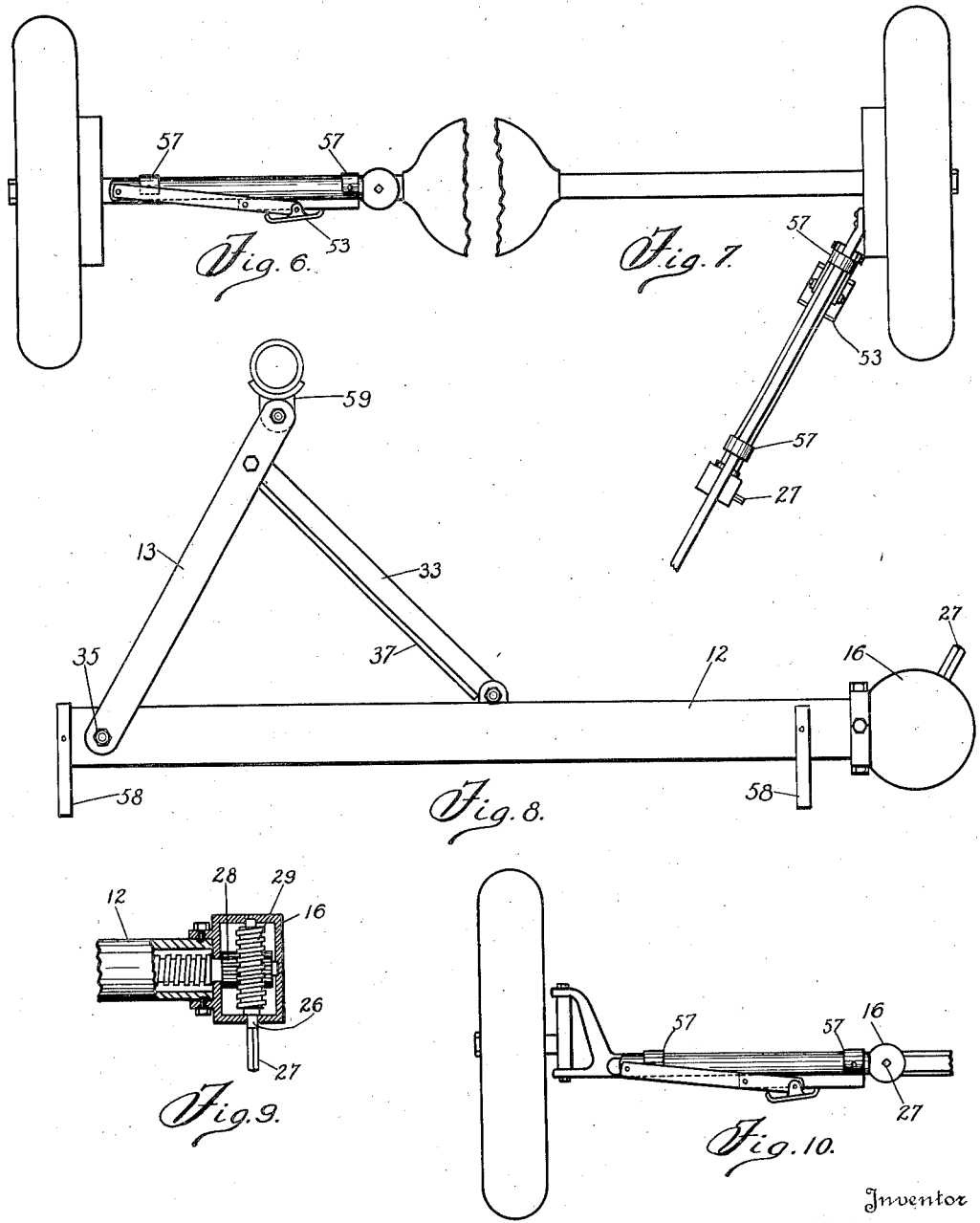

1,549,810

UNITED STATES PATENT OFFICE.

ANTHONY M. SAUER, OF CINCINNATI, OHIO.

LIFTING JACK.

Application filed March 26, 1925. Serial No. 18,555.

*To all whom it may concern:*

Be it known that I, ANTHONY M. SAUER, a citizen of the United States of America, and a resident of Cincinnati, in the county of Hamilton and State of Ohio, have invented new and useful Improvements in a Lifting Jack, of which the following is a specification.

This invention relates to lifting jacks and has for an object the provision of a novel type of jack which is especially adapted to efficient and expeditious use with the modern type of automobiles which has its step or running board portions spaced at a very short distance from the ground and which uses balloon tires.

Another object is to provide a jack for the purpose stated which is adapted to be permanently attached to a portion of the automobile adjacent a wheel, is readily accessible for operation, and which is adapted to be folded upon itself to conform substantially to the portion of the automobile to which it is attached.

Another object is to provide a jack of this kind which may, by the simple addition of feet or base members, be adapted to general use.

Another object is to provide a device of the type referred to which is very powerful and is proportionally easy to operate.

Another object is to provide a jack adapted to be permanently mounted adjacent a wheel of an automobile, and which is adapted to receive a caster or the like which may serve in place of an automobile wheel in an emergency.

These and other objects are attained by the means described herein and disclosed in the accompanying drawings, in which:

Fig. 1 is a fragmental side elevation of an automobile chassis having a device of my invention mounted upon one of the rear springs, and showing the device in an operative position.

Fig. 2 is a side view of the device shown partly in cross section and having an auxiliary caster mounted thereon in operative position.

Fig. 3 is a view taken on line 3—3 of Fig. 1.

Fig. 4 is a cross sectional view taken on line 4—4 of Fig. 2.

Fig. 5 is a plan view of a plate connecting member such as is used in connecting the jack adjacent the axle as shown in Fig. 1.

Fig. 6 is a fragmental end view showing the jack attached to the rear axle of an automobile.

Fig. 7 is a fragmental plan view showing the manner of attaching the jack of my invention to a radius rod of an automobile.

Fig. 8 is an elevational view of the jack of my invention provided with feed or base members.

Fig. 9 is a fragmental cross section of a modified form of drive for the jack of my invention.

Fig. 10 shows the jack applied to a front axle.

The jack of my invention comprises means for combining the power of a jack screw and that of levers in a novel manner, and to the end that great lifting power is attained. The device comprises a tubular member 12 having an arm 13 pivotally mounted at its one end 14. At the opposite end 15 of the tubular member 12 there is mounted a closing housing member 16 provided with a wall 17 which abuts the end 15 of the tube. The housing 16 may be secured to the tube 12 by any suitable means such as set screws 18 passing through the housing and into the wall of the tube. The wall 17 of the housing 16 is provided with a bore 19 through which extends a smooth portion 20 of a jack screw 21. The smooth portion 20 is suitably journaled in the bore 19 and may be provided with a ball or roller bearing if desired. The jack screw 21 may be provided with a shouldered portion 22 for abutment against one side of the wall 17 of the housing 16 and a suitable bevel gear 23 provided with an integral collar portion 24 is mounted upon the end of the jack screw interiorly of the housing 16, being secured thereto by means of a tapered pin or any other approved means. In this manner the jack screw 21 is held against longitudinal movement in the housing 16, while it may be revolubly actuated by the bevel gear 23. A suitable bevel gear 25 is revolubly mounted within the housing 16 and meshes with the bevel gear 23, and shaft 26 to which the bevel gear 25 is fixedly secured is provided with an angular portion 27 which extends through the housing 16 and is adapted to receive a suitable socket member of a crank (not shown) by means of which rotatory motion is imparted to the bevel gear 25 and transmitted thereby to bevel gear 23 and jack screw 21. As shown in Fig. 9 the bevel gear 23 may be replaced by a spiral gear 28 and the bevel gear 25 may be replaced by a meshing worm 29 on the shaft 26. A block 30 is adapted to be reciprocated interiorly of the tubular member 12 and is provided with an internally threaded bore for receiving the threads of the jack screw 21. The tubular member 12 is provided with a narrow longitudinal aperture 31 through which extends a lug 32 integral with the threaded block 30. From the foregoing it will be apparent that when rotatory motion is imparted to the bevel gear 25 from the shaft 26 that the jack screw 21 will be rotated while the block 30, which is precluded from rotation by reason of the lug 32 extending through the slot 31, will travel longitudinally inside of the tubular member 12. A link 33 is pivotally mounted at 34 upon the lug 32 of the block 30 at its one end and is also pivotally mounted at 35 to the arm or lever 13. It will be readily apparent that as the lug 32 on the block 30 travels through the slot or aperture 31 in the tube 12 the end 36 of the arm 13 will be moved toward or away from the tube 12, and that the link 33 will assume a position parallel to and in abutment with the tube 12 when the block 30 is at one end of the aperture 31. The link 33 is provided with a rib or fin 37 which may enter into and form a complete closure for the aperture 31 thereby protecting the jack screw and block 30 against foreign matter when the jack is in an inoperative position. A clamping member 38 is provided with a bore 39 for receiving the tubular member 12 and is cut away at its bottom surface 40 so as to permit the slot or aperture 31 to be exposed to the bottom surface 40 thereon. This member is suitably positioned on the tubular member 12 and retained thereon by means of set screws 41. The upper portion of the clamping member 38 is provided with integral outwardly extending flanges 42 having threaded bores therein for reception of screws 43. A complementary clamping member 44 is provided with bores registering with the bores in the flanges 42. The portions 45 of the clamping members 38 and 44 are developed into semi-cylindrical portions and are adapted to receive the leaves 46 of an automobile suspension spring between them. Spiral springs 47 encircle the upper portions of the screws 43 so that the springs 46 of the automobile suspension may have free movement. The semi-cylindrical faces 45 of the clamping members also permit this movement. The plate 48 (see Fig. 5), substantially the same width as the springs 46 of the automobile to which the jack is applied, is adapted to be inserted between the U-bolts 49 of the spring structure. The plate 48 is provided with a yoke comprising arms 50 carrying suitable registering perforations 51 for receiving a bolt 52 which secures the arm 13 to the end 14 of the tube 12. The end 36 of the arm 13 may also be provided with a pivotally mounted shoe or foot 53, and such shoe 53 may be of sufficient size to provide a firm, flat surface for engaging the surface of a road or floor. Suitable perforate ring members 54 may be provided upon the arm 13 and made integral therewith for receiving a shank 55 of a suitable auxiliary wheel or caster structure 56. It will be readily apparent that the clamping member 38—44 may be readily substituted for a simpler structure where the jack is secured to any part of an automobile other than the spring, for example, as shown in Figs. 6 and 7, a single strap clamp 57 will suffice to hold the device upon a front or rear axle or radius rod.

As shown in Fig. 8 the tubular member 12 is shown provided with suitable foot or base members 58 and the shaft 26 and angular extension 27 thereof is shown disposed at an oblique angle to the jack screw 21. The device as shown in Fig. 8 is of general utility and the shoe 53 may be replaced by any suitably shaped platform member 59 on which the load to be raised may rest.

It will be readily apparent that the hoisting member 16 may be suitably positioned upon the end of the tubular member 12 so that the angular portion 27 of the shaft 26 will be readily accessible for receiving a socket wrench or crank.

The operation of the device is readily apparent. When used as shown in Figs. 1, 6 and 7 and in fact when permanently attached to any part of an automobile, a separate jack is provided adjacent each wheel and is so positioned that the housing end 16 and the angular member 27 are readily accessible. When not in use the block 30 is moved to its extreme limit adjacent the housing 16 at which time the lug 32 and rib 37 will form a complete closure for the tubular member. At this time the arm 13 will also be substantially parallel to and in abutment with the tubular member and the link 33 so that there is substantially no projecting portion to present an unsightly appearance or to be in the way. When it is desired to change a tire or raise a wheel of an automobile from the ground the operator merely places a socket member of a suitable crank upon the angular portion 27 and revolves the shaft 26 which in turn rotates the bevel gear 25, bevel gear 23 and jack screw 21. The rotation of the jack screw 21 will move the block 30 and lug 32 away from the end 15 of the tubular member and the link 33 connected to the block 30 will push the arm 13 outwardly until the shoe 53 touches the ground. Further rotation will then raise the car from the ground on the arm 13 and the movement of this arm may be continued until said arm assumes a position perpendicular to the ground. The car has then been raised to the highest limit on the jack. As previously stated, the bevel gears or the worm and spiral gear arrangement provides a gear lifting power which is further enhanced by the leverage attained between the arm 13 and tubular member 12 by means of the slow advancement of the link 33.

What I claim is:

1. In a device of the class described the combination with a tubular member having a longitudinal aperture in the wall thereof, of an arm pivotally mounted at one end of the tubular member, a block mounted for reciprocation interiorly of the tubular member, a lug on the block extending through the elongated aperture in the housing, a link pivotally mounted at its opposite ends upon the lug and the arm, and rotatable means for reciprocating the block in the housing whereby the free end of the arm may be moved toward and away from the tubular member.

2. In a device of the class described the combination with a tubular member having a longitudinal aperture in the wall thereof, of an arm pivotally mounted at one end of the tubular member, a block mounted for reciprocation interiorly of the tubular member, a lug on the block extending through the elongated aperture in the housing, a link pivotally mounted at its opposite ends upon the lug and the arm, and rotatable means comprising a jack screw for reciprocating the block in the housing whereby the free end of the arm may be moved toward and away from the tubular member.

3. In a lifting jack the combination with a tubular member having an elongated opening in the wall thereof, an arm pivotally mounted upon the tubular member at its one end, a reciprocating block contained within the tubular member, a lug on the reciprocating block extending through the elongated opening in the tubular member, a link pivotally mounted at its opposite ends upon the arm and the lug on the reciprocating block, means for reciprocating the block within the tubular member whereby the link may be brought into longitudinal abutment with the tubular member when the block is at its one limit of reciprocation, and means carried by the link adapted to enter the elongated opening in the tubular member and to form a closure for said opening when the link is in longitudinal abutment with the tubular member.

4. In a lifting jack of the class described the combination with a tubular member having a longitudinally extending elongated opening therein, an arm pivotally mounted on the tubular member, a reciprocating block mounted interiorly of the tubular member, a lug on the block extending through the elongated aperture, a link pivotally mounted upon the reciprocating block and the arm, and a rib carried by the link and adapted to enter and to form a closure for the elongated aperture in the tubular member when the reciprocating block and lug are positioned at their one limit of reciprocation in the tubular member.

5. In a lifting jack of the class described, the combination of a tubular member having a longitudinally extending opening therein, an arm pivotally mounted at its one end adjacent the tubular member, a reciprocating block mounted interiorly of the tubular member, a lug on the block extending through the elongated aperture, a link pivotally mounted upon the reciprocating block and the arm, and a rib carried by the link and adapted to enter and to form a closure for the elongated aperture in the tubular member when the reciprocating block and lug are positioned at their one limit of reciprocation in the tubular member.

In testimony whereof, I have hereunto subscribed my name this 25th day of March, 1925.

ANTHONY M. SAUER.